(12) United States Patent
Shu et al.

(10) Patent No.: US 10,726,109 B2
(45) Date of Patent: Jul. 28, 2020

(54) METHOD AND SYSTEM FOR IDENTIFYING WHETHER AN APPLICATION IS GENUINE BY MEANS OF DIGITAL WATERMARKS

(71) Applicant: Beijing Kingsoft Internet Security Software Co Ltd, Beijing (CN)

(72) Inventors: Xin Shu, Beijing (CN); Nan Zhang, Beijing (CN); Yong Chen, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 441 days.

(21) Appl. No.: 15/320,842

(22) PCT Filed: Jun. 25, 2015

(86) PCT No.: PCT/CN2015/082322
§ 371 (c)(1),
(2) Date: Dec. 21, 2016

(87) PCT Pub. No.: WO2016/000557
PCT Pub. Date: Jan. 7, 2016

(65) Prior Publication Data
US 2017/0199992 A1  Jul. 13, 2017

(30) Foreign Application Priority Data
Jun. 30, 2014  (CN) .......................... 2014 1 0306828

(51) Int. Cl.
*G06F 21/16* (2013.01)
*G06F 8/53* (2018.01)

(52) U.S. Cl.
CPC ................ *G06F 21/16* (2013.01); *G06F 8/53* (2013.01)

(58) Field of Classification Search
CPC .................................. G06F 21/16; G06F 8/53
(Continued)

(56) References Cited

U.S. PATENT DOCUMENTS

| 6,725,372 B1* | 4/2004 | Lewis ................... G06T 1/0035 375/E7.089 |
| 2004/0172544 A1* | 9/2004 | Luo ....................... G06F 21/125 713/189 |

(Continued)

OTHER PUBLICATIONS

Podilchuk, "Digital Watermarking Algorithms and Applications", Jul. 2001, pp. 33-46 (Year: 2001).*

*Primary Examiner* — Alexander Lagor
*Assistant Examiner* — Gregory A Lane
(74) *Attorney, Agent, or Firm* — Squire Patton Boggs (US) LLP (57) ABSTRACT

Embodiments of the present application disclose a method and system for identifying whether an application is genuine by means of digital watermarks, which can conveniently determine whether an application is genuine. The method comprises: extracting a first digital watermark from an executable file of an application to be identified; using two decompiling-then-compiling algorithms on the executable file so as to generate, respectively, a first compilation file and a second compilation file having a same file format as that of the executable file, and extracting, respectively, a second digital watermark and a third digital watermark from the first compilation file and the second compilation file; acquiring, respectively, similarity between the first digital watermark and the second digital watermark and similarity between the first digital watermark and the third digital watermark; and if the similarity between the first digital watermark and the third digital watermark is higher than the similarity between the first digital watermark and the second digital watermark, determining that the application to be identified is genuine, otherwise, determining that the application to be identified is pirated. The present application is applicable to a scenario for identifying whether an application is genuine.

20 Claims, 3 Drawing Sheets

(58) Field of Classification Search
USPC .......................................................... 726/26
See application file for complete search history.

(56) References Cited

U.S. PATENT DOCUMENTS

| | | | |
|---|---|---|---|
| 2005/0025337 A1* | 2/2005 | Lu ......................... | G06T 1/0028 |
| | | | 382/100 |
| 2005/0262490 A1* | 11/2005 | Thomborson ......... | G06F 21/125 |
| | | | 717/145 |
| 2008/0155698 A1* | 6/2008 | Round .................. | G06F 21/121 |
| | | | 726/26 |
| 2011/0154121 A1* | 6/2011 | Dern .................... | G06F 11/3676 |
| | | | 714/38.1 |
| 2012/0330786 A1* | 12/2012 | Paleja ................... | G06Q 30/02 |
| | | | 705/26.41 |
| 2013/0152210 A1* | 6/2013 | Petrovic ................ | G06F 21/10 |
| | | | 726/26 |
| 2013/0293486 A1* | 11/2013 | Nave ..................... | G06F 3/041 |
| | | | 345/173 |
| 2014/0003649 A1* | 1/2014 | Wang .................... | G06K 9/348 |
| | | | 382/100 |
| 2014/0181803 A1* | 6/2014 | Cooper .................. | G06F 8/60 |
| | | | 717/178 |
| 2014/0245448 A1* | 8/2014 | Moon .................... | G06F 21/57 |
| | | | 726/25 |
| 2015/0093016 A1* | 4/2015 | Jiang .................... | G06T 1/0028 |
| | | | 382/154 |

* cited by examiner

METHOD AND SYSTEM FOR IDENTIFYING WHETHER AN APPLICATION IS GENUINE BY MEANS OF DIGITAL WATERMARKS

The present application claims priority to the Chinese patent application with the No. 201410306828.X, filed before the Chinese Patent Office on Jun. 30, 2014 and entitled "Method and system for identifying whether an application is genuine by means of digital watermarks", the entire content of which is incorporated by reference in the present application.

TECHNICAL FIELD

The present application relates to the field of mobile device application technology, and particularly to a method and system for identifying whether an application is genuine by means of digital watermarks.

BACKGROUND ART

With the popularity of the network, a large number of applications have been developed in order to meet various needs of users. However, the emergence of pirated applications affects the order of application market.

In order to identify whether an application is genuine, it is conventional in prior art to compare an application to be identified with a genuine application or compare the signature of an application to be identified with the signature of a genuine application, and if identical, the application to be identified is genuine; otherwise it is pirated. However, it is necessary to use the genuine application corresponding to the application to be identified in prior art in order to identify whether the application is genuine, which is inconvenient, for example, it is unable to identify whether the application is a genuine application when there is no corresponding genuine application.

SUMMARY OF THE INVENTION

In view of this, embodiments of the present application provide a method and system for identifying whether an application is genuine by means of digital watermarks, which can conveniently identify whether an application is genuine.

To achieve above objectives, embodiments of the present application adopt the following technical solutions:

In one aspect, embodiments of the present application provide a method for identifying whether an application is genuine by means of digital watermarks, which comprises:

acquiring an executable file of an application to be identified, and extracting a first digital watermark from the executable file;

using a decompiling-then-compiling algorithm on the executable file so as to generate a first compilation file having a same file format as that of the executable file, and extracting a second digital watermark from the first compilation file; wherein, the second digital watermark and the first digital watermark belong to the same type of digital watermarks;

using another decompiling-then-compiling algorithm on the executable file so as to generate a second compilation file having a same file format as that of the executable file, and extracting a third digital watermark from the second compilation file; wherein, the third digital watermark and the first digital watermark belong to the same type of digital watermarks; and in the another decompiling-then-compiling algorithm, the format of the file generated after decompiling is identical with that of a corresponding file generated during compiling and generating the executable file of a genuine application corresponding to the application to be identified;

acquiring similarity between the first digital watermark and the second digital watermark and similarity between the first digital watermark and the third digital watermark;

comparing the similarity between the first digital watermark and the second digital watermark with the similarity between the first digital watermark and the third digital watermark;

if the similarity between the first digital watermark and the third digital watermark is higher than the similarity between the first digital watermark and the second digital watermark, determining that the application to be identified is genuine; otherwise, determining that the application to be identified is pirated.

In the method for identifying whether an application is genuine by means of digital watermarks provided by the embodiments of the present application, if the similarity between the first digital watermark and the third digital watermark is higher than the similarity between the first digital watermark and the second digital watermark, it indicates that the process of compiling and generating an executable file of an application to be identified is more similar to that of compiling and generating an executable file of a genuine application corresponding to the application to be identified, thereby it can be determined that the application to be identified is genuine; otherwise it can be determined that the application to be identified is pirated. In this way, it is possible to conveniently identify whether an application to be identified is genuine even without any genuine applications for comparison.

In another aspect, embodiments of the present application disclose a system for identifying whether an application is genuine by means of digital watermarks, which comprises:

a first digital watermark extraction unit for acquiring an executable file of an application to be identified and extracting a first digital watermark from the executable file;

a second digital watermark extraction unit for using a decompiling-then-compiling algorithm on the executable file so as to generate a first compilation file having a same file format as that of the executable file, and extracting a second digital watermark from the first compilation file; wherein, the second digital watermark and the first digital watermark belong to the same type of digital watermarks;

a third digital watermark extraction unit for using another decompiling-then-compiling algorithm on the executable file so as to generate a second compilation file having a same file format as that of the executable file, and extracting a third digital watermark from the second compilation file; wherein, the third digital watermark and the first digital watermark belong to the same type of digital watermarks; and in the another decompiling-then-compiling algorithm, the format of the file generated after decompiling is identical with that of a corresponding file generated during compiling and generating the executable file of a genuine application corresponding to the application to be identified;

a similarity extraction unit for acquiring similarity between the first digital watermark and the second digital watermark and similarity between the first digital watermark and the third digital watermark;

a comparison unit for comparing the similarity between the first digital watermark and the second digital watermark with the similarity between the first digital watermark and the third digital watermark;

a determination unit for determining that, if the similarity between the first digital watermark and the third digital watermark is higher than the similarity between the first digital watermark and the second digital watermark, the application to be identified is genuine; otherwise, determining that the application to be identified is pirated.

Correspondingly, embodiments of the present application further provide a storage medium, wherein, the storage medium is configured to store applications, which are used for executing, when running, the method for identifying whether an application is genuine by means of digital watermarks provided by the present application.

To achieve the above objectives, embodiments of the present application further provide an application, wherein, the application is configured to execute, when running, the method for identifying whether an application is genuine by means of s digital watermarks provided by the present application.

To achieve the above objectives, embodiments of the present application further provide an electronic device comprising:

a processor, a memory, communication interfaces and communication bus;

the processor, the memory and the communication interfaces connecting to and communicating with each other by the communication bus;

the memory storing executable program codes;

the processor executing a program corresponding to the executable program codes stored in the memory by reading the executable program codes, for:

acquiring an executable file of an application to be identified and extracting a first digital watermark from the executable file;

using a decompiling-then-compiling algorithm on the executable file so as to generate a first compilation file having a same file format as that of the executable file, and extracting a second digital watermark from the first compilation file; wherein, the second digital watermark and the first digital watermark belong to the same type of digital watermarks;

using another decompiling-then-compiling algorithm on the executable file so as to generate a second compilation file having a same file format as that of the executable file, and extracting a third digital watermark from the second compilation file; wherein, the third digital watermark and the first digital watermark belong to the same type of digital watermarks; and in the another decompiling-then-compiling algorithm, the format of the file generated after decompiling is identical with that of a corresponding file generated during compiling and generating the executable file of a genuine application corresponding to the application to be identified;

acquiring similarity between the first digital watermark and the second digital watermark and similarity between the first digital watermark and the third digital watermark;

comparing the similarity between the first digital watermark and the second digital watermark with the similarity between the first digital watermark and the third digital watermark;

if the similarity between the first digital watermark and the third digital watermark is higher than the similarity between the first digital watermark and the second digital watermark, determining that the application to be identified is genuine; otherwise, determining that the application to be identified is pirated.

In the system for identifying whether an application is genuine by means of digital watermarks provided by the embodiments of the present application, if the similarity between the first digital watermark and the third digital watermark is higher than the similarity between the first digital watermark and the second digital watermark, it indicates that the process of compiling and generating an executable file of an application to be identified is more similar to that of compiling and generating an executable file of a genuine application corresponding to the application to be identified, thereby it can be determined that the application to be identified is genuine; otherwise it can be determined that the application to be identified is pirated. In this way, it is possible to conveniently identify whether an application to be identified is genuine even without any genuine applications for comparison.

BRIEF DESCRIPTION OF FIGURES

In order to describe the embodiments of the present application or the technical solutions in the prior art more clearly, drawings required for describing embodiments of the present application or the prior art will be described briefly below. It is obvious that the drawings below are only for some embodiments of the present application, and those skilled in the art can also obtain further drawings based on these drawings without any creative efforts.

DETAILED DESCRIPTION OF THE INVENTION

The method and system for identifying whether an application is genuine by means of digital watermarks will be described in detail below in conjunction with drawings.

It should be clear that the described embodiments are only a part of the embodiments of the present application, rather than all of them. All other embodiments obtained based on the embodiments of the present application by those skilled in the art without any creative efforts fall into the protection scope defined by the present application.

Figure 1:
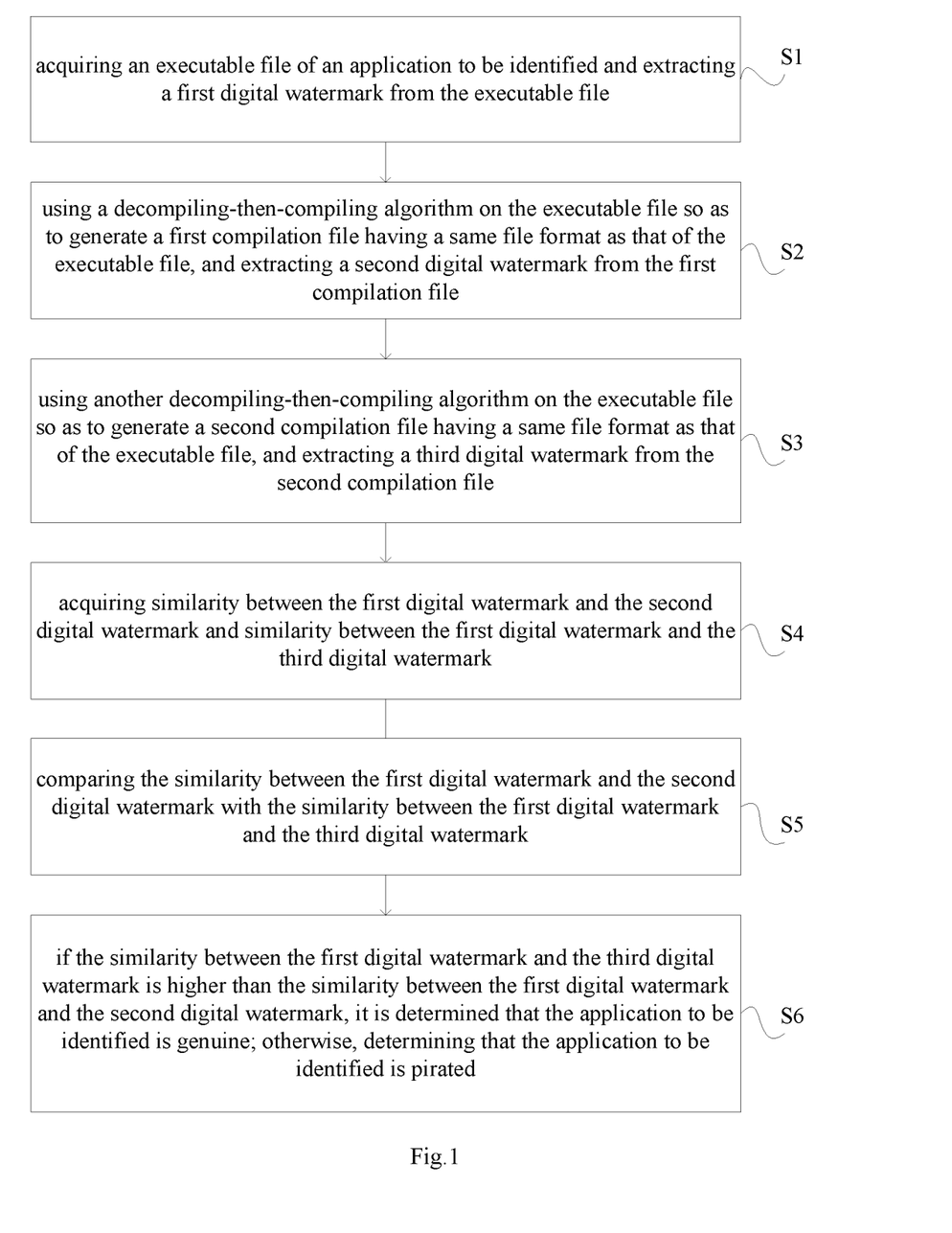
FIG. 1 is a schematic flowchart of an embodiment of a method for identifying whether an application is genuine by means of digital watermarks in the present application.

Referring to FIG. 1, a method for identifying whether an application is genuine by means of digital watermarks provided by an embodiment of the present application comprises:

S1: acquiring an executable file of an application to be identified and extracting a first digital watermark from the executable file;

S2: using a decompiling-then-compiling algorithm on the executable file so as to generate a first compilation file having a same file format as that of the executable file, and extracting a second digital watermark from the first compilation file; wherein, the second digital watermark and the first digital watermark belong to the same type of digital watermarks;

S3: using another decompiling-then-compiling algorithm on the executable file so as to generate a second compilation file having a same file format as that of the executable file, and extracting a third digital watermark from the second compilation file; wherein, the third digital watermark and the first digital watermark belong to the same type of digital watermarks; and in the another decompiling-then-compiling algorithm, the format of the file generated after decompiling is identical with that of a corresponding file generated during compiling and generating the executable file of a genuine application corresponding to the application to be identified;

S4: acquiring similarity between the first digital watermark and the second digital watermark and similarity between the first digital watermark and the third digital watermark;

S5: comparing the similarity between the first digital watermark and the second digital watermark with the similarity between the first digital watermark and the third digital watermark;

S6: if the similarity between the first digital watermark and the third digital watermark is higher than the similarity between the first digital watermark and the second digital watermark, determining that the application to be identified is genuine; otherwise, determining that the application to be identified is pirated.

In the present embodiment, the system environment for the application to be identified can be an Android system or other operating systems, no limitations are made thereto in the present application In the method for identifying whether an application is genuine by means of digital watermarks provided by the embodiments of the present application, if the similarity between the first digital watermark and the third digital watermark is higher than the similarity between the first digital watermark and the second digital watermark, it indicates that the process of compiling and generating an executable file of an application to be identified is more similar to that of compiling and generating an executable file of a genuine application corresponding to the application to be identified, thereby it can be determined that the application to be identified is genuine; otherwise, it can be determined that the application to be identified is pirated. In this way, it is possible to conveniently identify whether an application to be identified is genuine even without any genuine applications for comparison.

Optionally, in another embodiment of the method for identifying whether an application is genuine by means of digital watermarks provided by the present application, the step of using a decompiling-then-compiling algorithm on the executable file so as to generate a first compilation file having a same file format as that of the executable file comprises:

decompiling the executable file by using a first decompilation algorithm so as to generate a first decompilation file, compiling the first decompilation file by using a first compilation algorithm so as to generate a first compilation file having a same file format as that of the executable file.

Optionally, in another embodiment of the method for identifying whether an application is genuine by means of digital watermarks provided by the present application, the step of using another decompiling-then-compiling algorithm on the executable file so as to generate a second compilation file having a same file format as that of the executable file comprises:

decompiling the executable file by using a second decompilation algorithm so as to generate a second decompilation file, compiling the second decompilation file by using a second compilation algorithm so as to generate a second compilation file having a same file format as that of the executable file.

Optionally, in another embodiment of the method for identifying whether an application is genuine by means of digital watermarks in the present application, the application is an application applicable to an Android operating system;

wherein, the step of acquiring an executable file of an application to be identified comprises: acquiring the executable file, which is a DEX file, of the application to be identified. In the present embodiment, if the obtained executable file of the application to be identified is an APK file, then it is required to decompress this file so as to acquire the executable file "classes.dex" therein.

wherein, the DEX file is an executable file on an Android platform.

APK is an abbreviation for AndroidPackage, i.e. an Android installation package. The projects compiled by "android sdk" are packaged into an installation program file with a format of APK. It can be installed as long as the APK file is executed after directly transmitted to an Android simulator or an Android phone.

Optionally, in another embodiment of the method for identifying whether an application is genuine by means of digital watermarks in the present application, the first decompilation file is of a SMALI format, and the second decompilation file is of a CLASS format.

In the present embodiment, the first decompilation file may be of a SMALI format or other formats, the second decompilation file may be of a CLASS format or other formats, no limitations are made thereto in the present application.

Wherein, files having a SMALI format are code files written with language of a Register of a Java virtual machine in an Android system, files having a CLASS format are binary files which can be operated on any hardware platform and operating system as long as they support a Java virtual machine.

DX is one of the tools in AndroidSDK and is used for converting a series of classfiles into a DEX file. DX is normally present under the directory of "android-sdk/platform-tools/lib" and the file name thereof is dx.jar.

For an application applicable to an Android operating system, a genuine APK file is created by generating a CLASS file after compiling a Java source program and then packaging the CLASS file by means of a DX tool. While a pirated APK application is created by a file of a SMALI format which is generated by decompiling a genuine APK file. Thus, if the similarity between the first digital watermark and the third digital watermark is higher than the similarity between the first digital watermark and the second digital watermark, it indicates that the executable file acquired from an application to be identified is generated by compiling a CLASS file, thereby it can be determined that the application to be identified is genuine; otherwise, it indicates that the executable file obtained from an application to be identified is generated by a SMALI file, thereby it can be determined that the application to be identified is pirated.

Optionally, in another embodiment of the method for identifying whether an application is genuine by means of digital watermarks in the present application, the first decompilation algorithm is a BAKSMALI algorithm, and the first compilation algorithm is a SMALI algorithm.

In the present embodiment, the first decompilation algorithm may be a BAKSMALI algorithm or other algorithms, the first compilation algorithm may be a SAMLI algorithm or other algorithms, no limitations are made thereto in the present application.

Wherein, BAKSMALI, SAMLI refer to a disassembler and an assembler for disassembling and assembling files having DEX format used by a Java virtual machine in an Android system respectively.

Optionally, in another embodiment of the method for identifying whether an application is genuine by means of digital watermarks in the present application, the second decompilation algorithm is a DEX2JAR algorithm, and the second compilation algorithm is a DX algorithm.

In the present embodiment, the second decompilation algorithm may be a DEX2JAR algorithm or other algorithms, the second compilation algorithm may be a DX algorithm or other algorithms, no limitations are made thereto in the present application.

Wherein, DEX2JAR is a disassembler for converting a DEX file in an Android system to a CLASS file.

Optionally, in another embodiment of the method for identifying whether an application is genuine by means of digital watermarks in the present application, the digital watermark comprises class sorting, to which the present application is not limited, and the digital watermarks can be of other forms.

In the present embodiment, class is a definition for a certain object in an object-oriented programming language, and includes information about object action modes, comprising names, methods, attributes and events. Class sorting is to sort classes contained included in the files generated by decompiling and compiling the executable file of an application to be identified.

Optionally, in another embodiment of the method for identifying whether an application is genuine by means of digital watermarks in the present application, the step of acquiring similarity between the first digital watermark and the second digital watermark and similarity between the first digital watermark and the third digital watermark comprises: acquiring the similarity between the first digital watermark and the second digital watermark and the similarity between the first digital watermark and the third digital watermark by means of an edit distance algorithm.

In the present embodiment, the algorithm for acquiring similarity may be an edit distance algorithm or other algorithms, no limitations are made thereto in the present application.

Optionally, in another embodiment of the method for identifying whether an application is genuine by means of digital watermarks in the present application, the step of using a decompiling-then-compiling algorithm on the executable file so as to generate a first compilation file having a same file format same as that of the executable file comprises: simulating the usage of the decompiling-then-compiling algorithm on the executable file so as to generate a first compilation file having a same file format as that of the executable file; and/or the step of using another decompiling-then-compiling algorithm on the executable file so as to generate a second compilation file having a same file format as that of the executable file comprises: simulating the usage of another decompiling-then-compiling algorithm on the executable file so as to generate a second compilation file having a same file format as that of the executable file.

In the present embodiment, by using a simulation process, it is not required the first compilation file to be actually generated, and a second digital watermark can be extracted during the actual generation of the first compilation file, which leads to expedited extraction of the second digital watermark. The present application is not limited thereto, it is also possible to extract a second digital watermark from the first compilation file after the first compilation file is actually generated.

Similarly, by using a simulation process, it is not required the second compilation file to be actually generate, and a third digital watermark can be extracted during the actual generation of the second compilation file, which leads to expedited extraction of the third digital watermark. The present application is not limited thereto, it is also possible to extract a third digital watermark from the second compilation file after the second compilation file is actually generated.

Figure 2:
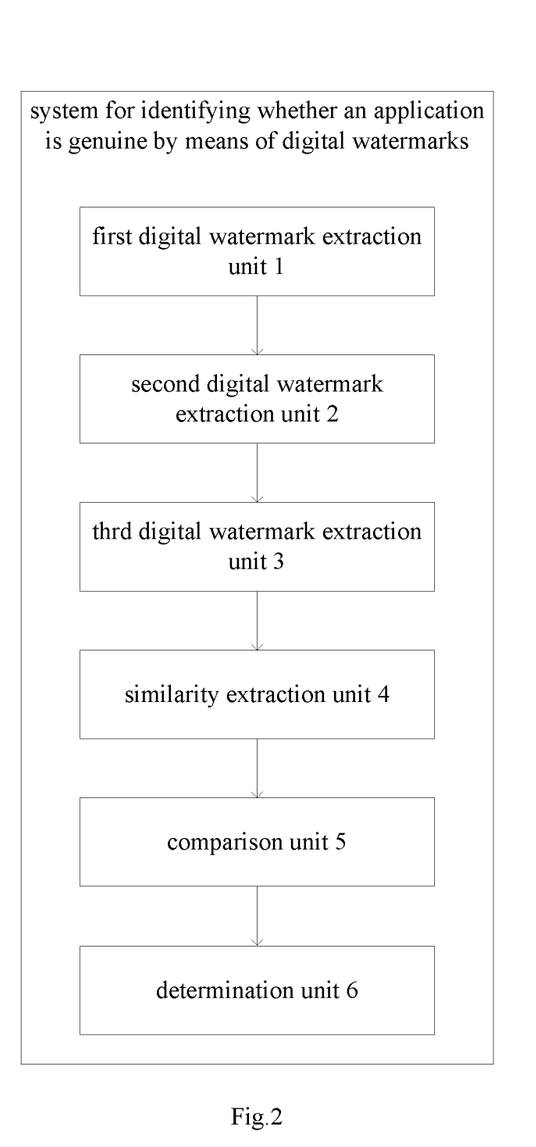
FIG. 2 is a schematic structural block diagram of an embodiment of a system for identifying whether an application is genuine by means of digital watermarks in the present application.

Referring to FIG. 2, a system for identifying whether an application is genuine by means of digital watermarks provided by embodiments of the present application comprises:

a first digital watermark extraction unit 1 for extracting a first digital watermark from an executable file of an application to be identified; a second digital watermark extraction unit 2 for using a decompiling-then-compiling algorithm on the executable file so as to generate a first compilation file having a same file format same as that of the executable file, and extracting a second digital watermark from the first compilation file; wherein, the second digital watermark and the first digital watermark belong to the same type of digital watermarks; a third digital watermark extraction unit 3 for using another decompiling-then-compiling algorithm on the executable file so as to generate a second compilation file having a same file format as that of the executable file, and extracting a third digital watermark from the second compilation file; wherein, the third digital watermark and the first digital watermark belong to the same type of digital watermarks; and in the another decompiling-then-compiling algorithm, the format of the file generated after decompiling is identical with that of a corresponding file generated during compiling and generating the executable file of a genuine application corresponding to the application to be identified; a similarity extraction unit 4 for acquiring similarity between the first digital watermark and the second digital watermark and similarity between the first digital watermark and the third digital watermark; a comparison unit 5 for comparing the similarity between the first digital watermark and the second digital watermark with the similarity between the first digital watermark and the third digital watermark; a determination unit 6 for determining that, if the similarity between the first digital watermark and the third digital watermark is higher than the similarity between the first digital watermark and the second digital watermark, the application to be identified is genuine; otherwise, determining that the application to be identified is pirated.

In the present embodiment, the system environment for an application to be identified can be an Android system or other operating systems, no limitations are made thereto in the present application.

In the system for identifying whether an application is genuine by means of digital watermarks provided by the embodiments of the present application, if the similarity between the first digital watermark and the third digital watermark is higher than the similarity between the first digital watermark and the second digital watermark, it indicates that the process of compiling and generating an executable file of an application to be identified is more similar to that of compiling and generating an executable file of a genuine application corresponding to the application to be identified, thereby it can be determined that the application to be identified is genuine; otherwise, it can be determined that the application to be identified is pirated. In this way, it is possible to conveniently identify whether an application to be identified is genuine even without any genuine applications for comparison.

Figure 3:
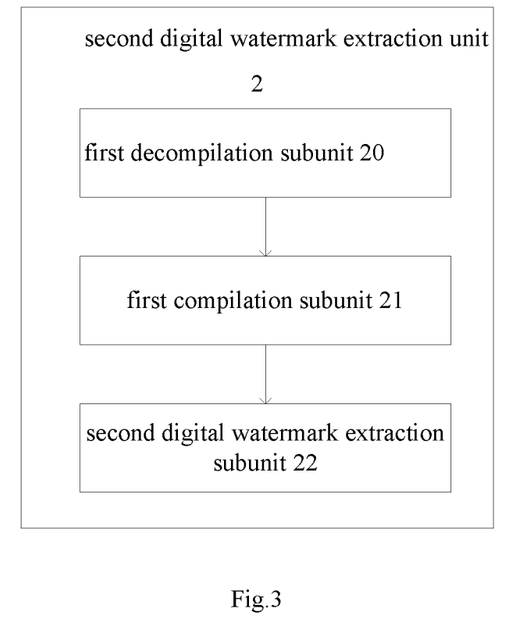
FIG. 3 is a schematic structural block diagram of an embodiment of a second digital watermark extraction unit in FIG. 2.

Optionally, referring to FIG. 3, in another embodiment of the system for identifying whether an application is genuine by means of digital watermarks in the present application, the second digital watermark extraction unit 2 may comprise: a first decompilation subunit 20 for decompiling the executable file by using a first decompilation algorithm so as to generate a first decompilation file; a first compilation subunit 21 for compiling the first decompilation file by using a first compilation algorithm so as to generate a first compilation file having a same file format as that of the executable file; a second digital watermark extraction subunit 22 for extracting a second digital watermark from the first compilation file.

Figure 4:
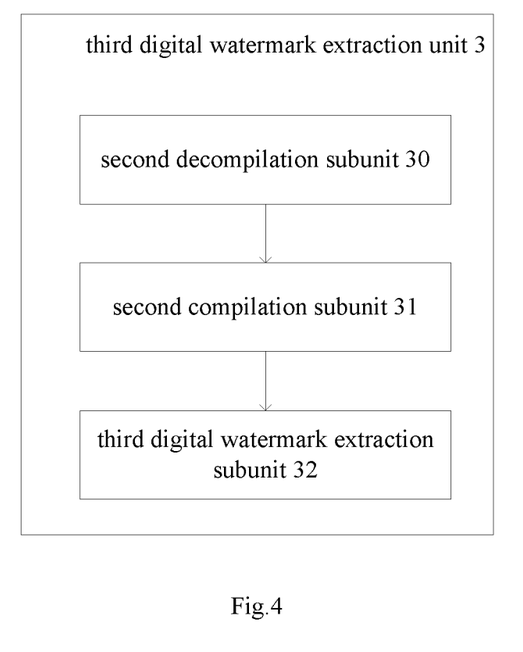
FIG. 4 is a schematic structural block diagram of an embodiment of a third digital watermark extraction unit in FIG. 2.

Optionally, referring to FIG. 4, in another embodiment of the system for identifying whether an application is genuine by means of digital watermarks in the present application, the third digital watermark extraction unit 3 may comprise: a second decompilation subunit 30 for decompiling the executable file by using a second decompilation algorithm so as to generate a second decompilation file; a second compilation subunit 31 for compiling the second decompilation file by using a second compilation algorithm so as to generate a second compilation file having a same file format as that of the executable file; a third digital watermark extraction subunit 32 for extracting a third digital watermark from the second compilation file.

Optionally, in another embodiment of the system for identifying whether an application is genuine by means of digital watermarks in the present application, the application is an application applicable to an Android operating system; wherein, the first digital watermark extraction unit is used for extracting a first digital watermark from the executable file, which is a DEX file, of an application to be identified.

In the present embodiment, if the obtained file is an APK file, then it is required to decompress this file so as to acquire the executable file "classes.dex" therein.

Wherein, APK is an abbreviation for AndroidPackage, i.e. an Android installation package. The DEX file is an executable file on an Android platform.

Optionally, in another embodiment of the system for identifying whether an application is genuine by means of digital watermarks in the present application, the first decompilation file is of a SMALI format, and the second decompilation file is of a CLASS format.

In the present embodiment, the first decompilation file may be of a SMALI format or other formats, the second decompilation file may be of a CLASS format or other formats, no limitations are made thereto in the present application.

Wherein, files having a SMALI format are code files written with the language of a Register of a Java virtual machine in an Android system, files having a CLASS format are binary files which can be operated on any hardware platform and operating system as long as they support a Java virtual machine.

DX is one of the tools in AndroidSDK and is used for converting a series of classfiles into a DEX file. DX is normally present under the directory of "android-sdk/platform-tools/lib" and the file name thereof is dx.jar.

For an application applicable to an Android operating system, a genuine APK file is created by generating a CLASS file after compiling a Java source program and then packaging the CLASS file by means of a DX tool. While a pirated APK application is created by a file of a SMALI format which is generated by decompiling a genuine APK file. Thus, if the similarity between the first digital watermark and the third digital watermark is higher than the similarity between the first digital watermark and the second digital watermark, it indicates that the executable file acquired from an application to be identified is generated by compiling a CLASS file, thereby it can be determined that the application to be identified is genuine; otherwise, it indicates that the executable file obtained from an application to be identified is generated by a SMALI file, thereby it can be determined that the application to be identified is pirated.

Optionally, in another embodiment of the system for identifying whether an application is genuine by means of digital watermarks in the present application, the first decompilation algorithm is a BAKSMALI algorithm, and the first compilation algorithm is a SMALI algorithm.

In the present embodiment, the first decompilation algorithm may be a BAKSMALI algorithm or other algorithms, the first compilation algorithm may be a SAMLI algorithm or other algorithms, no limitations are made thereto in the present application.

wherein, the BAKSMALI, SAMLI refer to a disassembler and an assembler for disassembling and assembling files having a DEX format used by a Java virtual machine in an Android system respectively.

Optionally, in another embodiment of the system for identifying whether an application is genuine by means of digital watermarks in the present application, the second decompilation algorithm is a DEX2JAR algorithm, and the second compilation algorithm is a DX algorithm.

In the present embodiment, the second decompilation algorithm may be a DEX2JAR algorithm or other algorithms, the second compilation algorithm may be a DX algorithm or other algorithms, no limitations are made thereto in the present application.

wherein, DEX2JAR is a disassembler for converting a DEX file in an Android system into a CLASS file.

Optionally, in another embodiment of the system for identifying whether an application is genuine by means of digital watermarks in the present application, the digital watermark comprises class sorting, to which the present application is not limited, and the digital watermarks can be of other forms.

In the present embodiment, class is a definition for a certain object in an object-oriented programming language, and includes information about object action modes, comprising names, methods, attributes and events. The class sorting is to sort classes included in the files generated by decompiling and compiling the executable file of an application to be identified.

Optionally, in another embodiment of the system for identifying whether an application is genuine by means of digital watermarks in the present application, the similarity extraction unit is used for acquiring similarity between the first digital watermark and the second digital watermark and similarity between the first digital watermark and the third digital watermark by means of an edit distance algorithm.

In the present embodiment, the algorithm for acquiring similarity may be an edit distance algorithm or other algorithms, no limitations are made thereto in the present application.

Optionally, in another embodiment of the system for identifying whether an application is genuine by means of digital watermarks in the present application, the system further comprises a first simulation unit for simulating the usage of a decompiling-then-compiling algorithm on the executable file so as to generate a first compilation file having a same file format as that of the executable file; and/or a second simulation unit for simulating the usage of another decompiling-then-compiling algorithm on the executable file so as to generate a second compilation file having a same file format as that of the executable file.

In the present embodiment, by using the simulation process, it is not required a first compilation file to be actually generated, and a second digital watermark can be extracted during the actual generation of a first compilation file, which leads to expedited extraction of the second digital watermark. The present application is not limited thereto, it is also possible to extract a second digital watermark from a first compilation file after the first compilation file is actually generated.

Similarly, by using the simulation process, it is not actually required a second compilation file to be actually generated, and a third digital watermark can be extracted during the actual generation of the second compilation file, which leads to expedited extraction of the third digital watermark. The present application is not limited thereto, it is also possible to extract a third digital watermark from a second compilation file after the second compilation file is actually generated.

To achieve the above objectives, embodiments of the present application further provide a storage medium, wherein, the storage medium is configured to store applications, which are used for executing, when running, the method for identifying whether an application is genuine by means of digital watermarks provided by the embodiments of the present application. Wherein, the method for identifying whether an application is genuine by means of digital watermarks provided by the present application comprises:

acquiring an executable file of an application to be identified and extracting a first digital watermark from the executable file;

using a decompiling-then-compiling algorithm on the executable file so as to generate a first compilation file having a same file format as that of the executable file, and extracting a second digital watermark from the first compilation file; wherein, the second digital watermark and the first digital watermark belong to the same type of digital watermarks;

using another decompiling-then-compiling algorithm on the executable file so as to generate a second compilation file having a same file format as that of the executable file, and extracting a third digital watermark from the second compilation file; wherein, the third digital watermark and the first digital watermark belong to the same type of digital watermarks; and in the another decompiling-then-compiling algorithm, the format of the file generated after decompiling is identical with that of a corresponding file generated during compiling and generating the executable file of a genuine application corresponding to the application to be identified;

acquiring similarity between the first digital watermark and the second digital watermark and similarity between the first digital watermark and the third digital watermark;

comparing the similarity between the first digital watermark and the second digital watermark with the similarity between the first digital watermark and the third digital watermark;

if the similarity between the first digital watermark and the third digital watermark is higher than the similarity between the first digital watermark and the second digital watermark, determining that the application to be identified is genuine, otherwise, determining that the application to be identified is pirated.

To achieve the above objectives, embodiments of the present application further provide an application, wherein, the application is configured to execute, when running, the method for identifying whether an application is genuine by means of digital watermarks provided by the embodiments of the present application, wherein, the method for identifying whether an application is genuine by means of digital watermarks provided by the present application comprises:

acquiring an executable file of an application to be identified and extracting a first digital watermark from the executable file;

using a decompiling-then-compiling algorithm on the executable file so as to generate a first compilation file having a same file format as that of the executable file, and extracting a second digital watermark from the first compilation file; wherein, the second digital watermark and the first digital watermark belong to the same type of digital watermarks;

using another decompiling-then-compiling algorithm on the executable file so as to generate a second compilation file having a same file format as that of the executable file, and extracting a third digital watermark from the second compilation file; wherein, the third digital watermark and the first digital watermark belong to the same type of digital watermarks; and in the another decompiling-then-compiling algorithm, the format of the file generated after decompiling is identical with that of a corresponding file generated during compiling and generating the executable file of a genuine application corresponding to the application to be identified;

acquiring similarity between the first digital watermark and the second digital watermark and similarity between the first digital watermark and the third digital watermark;

comparing the similarity between the first digital watermark and the second digital watermark with the similarity between the first digital watermark and the third digital watermark;

if the similarity between the first digital watermark and the third digital watermark is higher than the similarity between the first digital watermark and the second digital watermark, determining that the application to be identified is genuine, otherwise, determining that the application to be identified is pirated.

To achieve the above objectives, embodiments of the present application further provide an electronic device comprising:

a processor, a memory, communication interfaces and communication bus;

the processor, the memory and the communication interfaces connecting to and communicating with each other by the communication bus;

the memory storing executable program codes;

the processor executing a program corresponding to executable program codes stored in the memory by reading the executable program codes, for:

acquiring an executable file of an application to be identified and extracting a first digital watermark from the executable file;

using a decompiling-then-compiling algorithm on the executable file so as to generate a first compilation file having a same file format as that of the executable file, and extracting a second digital watermark from the first compilation file; wherein, the second digital watermark and the first digital watermark belong to the same type of digital watermarks;

using another decompiling-then-compiling algorithm on the executable file so as to generate a second compilation file having a same file format as that of the executable file, and extracting a third digital watermark from the second compilation file; wherein, the third digital watermark and the first digital watermark belong to the same type of digital watermarks; and in the another decompiling-then-compiling algorithm, the format of the file generated after decompiling is identical with that of a corresponding file generated during compiling and generating the executable file of a genuine application corresponding to the application to be identified;

acquiring similarity between the first digital watermark and the second digital watermark and similarity between the first digital watermark and the third digital watermark;

comparing the similarity between the first digital watermark and the second digital watermark with the similarity between the first digital watermark and the third digital watermark;

if the similarity between the first digital watermark and the third digital watermark is higher than the similarity between the first digital watermark and the second digital watermark, determining that the application to be identified is genuine, otherwise, determining that the application to be identified is pirated.

It can be understood by those with ordinary skills in the art that, all or a part of steps in the implementation of the above method can be carried out by the related hardware being instructed by computer programs, the computer programs can be stored in a computer readable storage medium and can comprise the steps of the above embodiments of a method when the program is running. Wherein, the storage medium may be a magnetic disc, an optical disc, a read-only memory (ROM) or a random access memory (RAM) and the like.

The above disclosed embodiments are merely preferred ones of the present application, to which the protection scope of the present application is not limited. Any alterations or substitutions that can be easily arrived at by those with ordinary skills in the art within the technical scope disclosed by the present application should fall in the protection scope of the present application. Thus, the protection scope of the present application should be defined by the protection scope of the claims.

What is claimed is:

1. A method for identifying whether an application is genuine by means of digital watermarks, characterized in that the method comprises:

acquiring an executable file of an application to be identified and extracting a first digital watermark from the executable file;

using a decompiling-then-compiling algorithm on the executable file so as to generate a first compilation file having a same file format as that of the executable file, and extracting a second digital watermark from the first compilation file; wherein, the second digital watermark and the first digital watermark belong to the same type of digital watermarks;

using another decompiling-then-compiling algorithm that is different with the decompiling-then-compiling algorithm on the executable file so as to generate a second compilation file having a same file format as that of the executable file, and extracting a third digital watermark from the second compilation file; wherein, the third digital watermark and the first digital watermark belong to the same type of digital watermarks; and in the another decompiling-then-compiling algorithm, the format of the file generated after decompiling is identical with that of a corresponding file generated during compiling and generating the executable file of a genuine application corresponding to the application to be identified;

acquiring similarity between the first digital watermark and the second digital watermark and similarity between the first digital watermark and the third digital watermark;

comparing the similarity between the first digital watermark and the second digital watermark with the similarity between the first digital watermark and the third digital watermark; and if the similarity between the first digital watermark and the third digital watermark is higher than the similarity between the first digital watermark and the second digital watermark, determining that the application to be identified is genuine, otherwise, determining that the application to be identified is pirated.

2. The method for identifying whether an application is genuine by means of digital watermarks according to claim 1, characterized in that, the step of using the decompiling-then-compiling algorithm on the executable file so as to generate the first compilation file having a same file format as that of the executable file comprises:

decompiling the executable file by using a first decompilation algorithm so as to generate a first decompilation file, compiling the first decompilation file by using a first compilation algorithm so as to generate the first compilation file having a same file format as that of the executable file.

3. The method for identifying whether an application is genuine by means of digital watermarks according to claim 1, characterized in that, the step of using another decompiling-then-compiling algorithm on the executable file so as to generate the second compilation file having a same file format as that of the executable file comprises:

decompiling the executable file by using a second decompilation algorithm so as to generate a second decompilation file, compiling the second decompilation file by using a second compilation algorithm so as to generate the second compilation file having a same file format as that of the executable file.

4. The method for identifying whether an application is genuine by means of digital watermarks according to claim 1, characterized in that, the application is an application applicable to an Android operating system;

wherein, the step of acquiring an executable file of an application to be identified comprises:

acquiring the executable file, which is a DEX file, of the application to be identified.

5. The method for identifying whether an application is genuine by means of digital watermarks according to claim 4, characterized in that, the first decompilation file is of a SMALI format, and the second decompilation file is of a CLASS format.

6. The method for identifying whether an application is genuine by means of digital watermarks according to claim 5, characterized in that, the first decompilation algorithm is a BAKSMALI algorithm, and the first compilation algorithm is a SMALI algorithm.

7. The method for identifying whether an application is genuine by means of digital watermarks according to claim 5, characterized in that, the second decompilation algorithm is a DEX2JAR algorithm, and the second compilation algorithm is a DX algorithm.

8. The method for identifying whether an application is genuine by means of digital watermarks according to claim 1, characterized in that, the digital watermarks comprise class sorting.

9. The method for identifying whether an application is genuine by means of digital watermarks according to claim 1, characterized in that, the step of acquiring similarity between the first digital watermark and the second digital watermark and similarity between the first digital watermark and the third digital watermark comprises:
   acquiring the similarity between the first digital watermark and the second digital watermark and the similarity between the first digital watermark and the third digital watermark by means of an edit distance algorithm.

10. The method for identifying whether an application is genuine by means of digital watermarks according to claim 1, characterized in that, the step of using the decompiling-then-compiling algorithm on the executable file so as to generate the first compilation file having a same file format as that of the executable file comprises:
   simulating the usage of the decompiling-then-compiling algorithm on the executable file so as to generate the first compilation file having a same file format as that of the executable file; and/or
   the step of using another decompiling-then-compiling algorithm on the executable file so as to generate the second compilation file having a same file format as that of the executable file comprises:
   simulating the usage of another decompiling-then-compiling algorithm on the executable file so as to generate the second compilation file having a same file format as that of the executable file.

11. An electronic device for identifying whether an application is genuine by means of digital watermarks, characterized in that the electronic device comprises:
   a processor, a memory, communication interfaces and communication bus;
   the processor, the memory and the communication interfaces connecting to and communicating with each other by the communication bus;
   the memory storing executable program codes;
   the processor executing a program corresponding to the executable program codes stored in the memory by reading the executable program codes to perform the steps of:
   extracting a first digital watermark from an executable file of an application to be identified;
   using a decompiling-then-compiling algorithm on the executable file so as to generate a first compilation file having a same file format as that of the executable file, and extracting a second digital watermark from the first compilation file; wherein, the second digital watermark and the first digital watermark belong to the same type of digital watermarks;
   using another decompiling-then-compiling algorithm that is different with the decompiling-then-compiling algorithm on the executable file so as to generate a second compilation file having a same file format as that of the executable file, and extracting a third digital watermark from the second compilation file; wherein, the third digital watermark and the first digital watermark belong to the same type of digital watermarks; and in the another decompiling-then-compiling algorithm, the format of the file generated after decompiling is identical with that of a corresponding file generated during compiling and generating the executable file of a genuine application corresponding to the application to be identified;
   acquiring similarity between the first digital watermark and the second digital watermark and similarity between the first digital watermark and the third digital watermark;
   comparing the similarity between the first digital watermark and the second digital watermark with the similarity between the first digital watermark and the third digital watermark;
   and
   if the similarity between the first digital watermark and the third digital watermark is higher than the similarity between the first digital watermark and the second digital watermark, determining that the application to be identified is genuine, otherwise, determining that the application to be identified is pirated.

12. The electronic device for identifying whether an application is genuine by means of digital watermarks according to claim 11, characterized in that, the step of using the decompiling-then-compiling algorithm on the executable file so as to generate the first compilation file having a same file format as that of the executable file and extracting a second digital watermark from the first compilation file comprises:
   decompiling the executable file by using a first decompilation algorithm so as to generate the first decompilation file;
   compiling the first decompilation file by using a first compilation algorithm so as to generate the first compilation file having a same file format as that of the executable file; and
   extracting a second digital watermark from the first compilation file.

13. The electronic device for identifying whether an application is genuine by means of digital watermarks according to claim 11, characterized in that, the step of using another decompiling-then-compiling algorithm on the executable file so as to generate the second compilation file having a same file format as that of the executable file and extracting a third digital watermark from the second compilation file comprises:
   decompiling the executable file by using a second decompilation algorithm so as to generate a second decompilation file;
   compiling the second decompilation file by using a second compilation algorithm so as to generate the second compilation file having a same file format as that of the executable file; and
   extracting a third digital watermark from the second compilation file.

14. The electronic device for identifying whether an application is genuine by means of digital watermarks according to claim 11, characterized in that, the application is an application applicable to an Android operating system;
   wherein, the step of extracting a first digital watermark from an executable file of an application to be identified comprises extracting a first digital watermark from the executable file, which is a DEX file, of an application to be identified.

15. The electronic device for identifying whether an application is genuine by means of digital watermarks according to claim 14, characterized in that, the first decompilation file is of a SMALI format, and the second decompilation file is of a CLASS format.

16. The electronic device for identifying whether an application is genuine by means of digital watermarks according to claim 15, characterized in that, the first decompilation algorithm is a BAKSMALI algorithm, and the first compilation algorithm is a SMALI algorithm.

17. The electronic device for identifying whether an application is genuine by means of digital watermarks according to claim 15, characterized in that, the second decompilation algorithm is a DEX2JAR algorithm, and the second compilation algorithm is a DX algorithm.

18. The electronic device for identifying whether an application is genuine by means of digital watermarks according to claim 11, characterized in that, the digital watermarks comprise class sorting.

19. The electronic device for identifying whether an application is genuine by means of digital watermarks according to claim 11, characterized in that, the step of acquiring similarity between the first digital watermark and the second digital watermark and similarity between the first digital watermark and the third digital watermark comprises acquiring the similarity between the first digital watermark and the second digital watermark and the similarity between the first digital watermark and the third digital watermark by means of an edit distance algorithm.

20. The electronic device for identifying whether an application is genuine by means of digital watermarks according to claim 11, characterized in that the step of using the decompiling-then-compiling algorithm on the executable file so as to generate the first compilation file having a same file format as that of the executable file comprises:
  simulating the usage of the decompiling-then-compiling algorithm on the executable file so as to generate the first compilation file having a same file format as that of the executable file; and/or
  the step of using another decompiling-then-compiling algorithm on the executable file so as to generate the second compilation file having a same file format as that of the executable file comprises simulating the usage of another decompiling-then-compiling algorithm on the executable file so as to generate the second compilation file having a same file format as that of the executable file.

\* \* \* \* \*